United States Patent [19]
Warner et al.

[11] 3,914,731
[45] Oct. 21, 1975

[54] ACOUSTIC WAVEFRONT PROCESSOR
[75] Inventors: Henry L. Warner; Henry C. Wallace; Donald L. Folds, all of Panama City, Fla.
[73] Assignee: The United States of America as represented by the Secretary of the Navy, Washington, D.C.
[22] Filed: July 3, 1974
[21] Appl. No.: 485,662

[52] U.S. Cl. ............................. 340/6 R; 340/16 R
[51] Int. Cl.² .......................................... G01S 3/80
[58] Field of Search ................ 340/6 R, 16 R, 3 R; 343/113 R

[56] References Cited
UNITED STATES PATENTS

| | | |
|---|---|---|
| 2,898,589 | 8/1959 | Abbott ........................... 343/113 R |
| 3,239,799 | 3/1966 | Boucheron, Jr. .................. 340/6 R |
| 3,278,891 | 10/1966 | Cowdery ........................... 340/6 R |
| 3,389,373 | 6/1968 | Angeloff et al. ................... 340/6 R |
| 3,710,330 | 1/1973 | Walters ........................... 340/6 R |

Primary Examiner—Richard A. Farley
Attorney, Agent, or Firm—Richard S. Sciascia; Don D. Doty; Harvey A. David

[57] ABSTRACT

A low frequency sonar beamformer system is described utilizing both frequency scaling and velocity scaling. The system is characterized by the use of frequency adding in the frequency scaling section, and the use of a variable frequency oscillator therein which is controlled to compensate for target range, frequency of received energy, and local water conditions.

3 Claims, 2 Drawing Figures

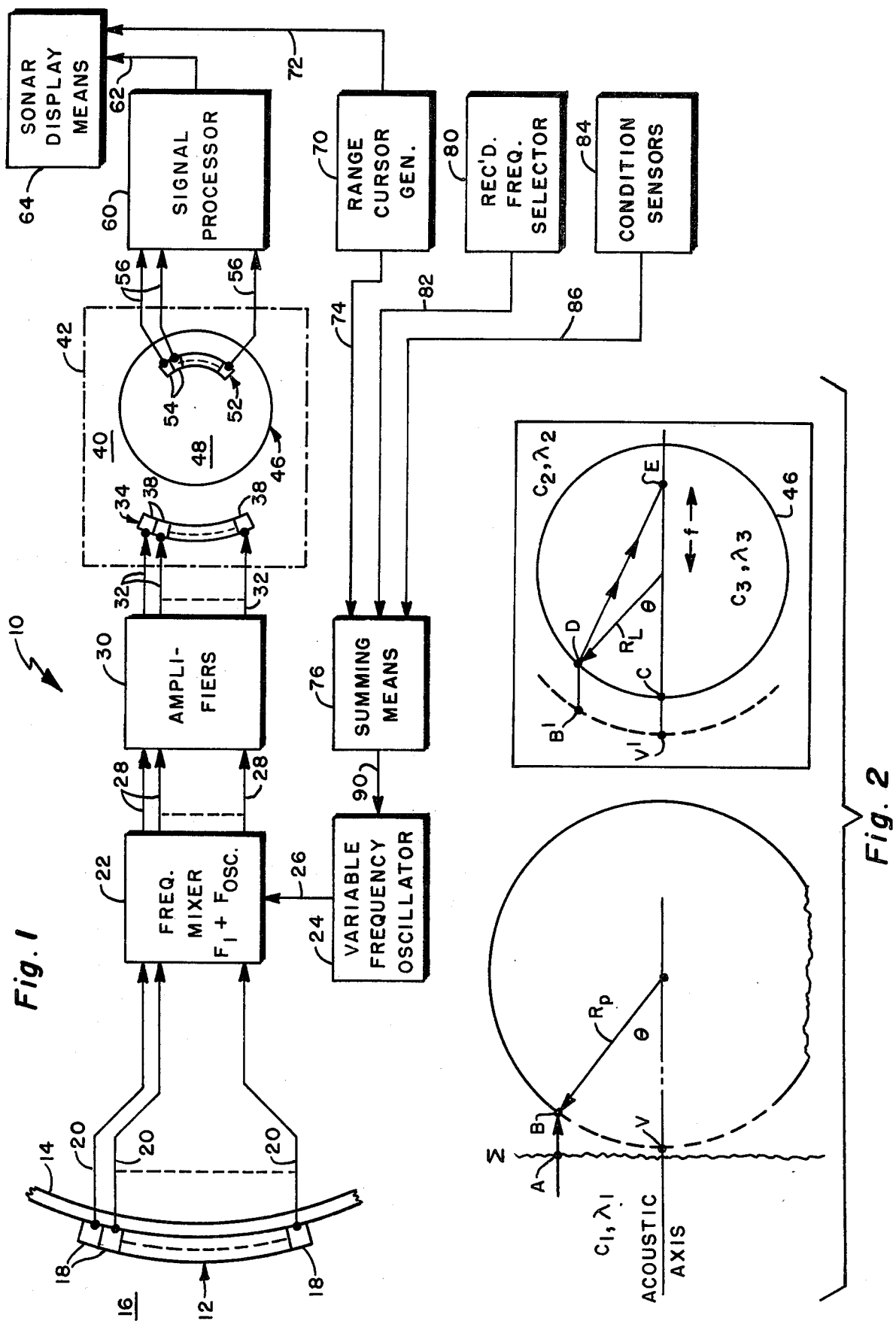

ACOUSTIC WAVEFRONT PROCESSOR

STATEMENT OF GOVERNMENT INTEREST

The invention described herein may be manufactured and used by or for the Government of the United States of America for Governmental purposes without the payment of any royalties thereon or therefor.

FIELD OF THE INVENTION

This invention relates to sonar systems, and more particularly to those systems wherein signals to or from an array of electroacoustical transducers are processed to produce what is known in the art as beamforming.

BACKGROUND OF THE INVENTION

Sonar systems having arrays of transducers, some of which arrays are quite large and may conform to a hull contour or some other predetermined configuration, generally utilize some signal processing beamforming technique which will produce the desired time/phase relationships between signals of the respective channels of the array. Among the techniques and devices used are variations of electronic time delay lines, recording and playback, digital time compression circuits, acoustic lenses, and the like.

The foregoing have been eminently useful in their application to high frequency sonars wherein the wavelengths dealt with are reasonably small, thereby permitting light, compact, and relatively inexpensive electronic systems, in spite of the sometimes very redundant nature of circuitry wherein many transducer element channels are involved. In the case of low frequency acoustic or sonar systems, however, where wavelengths and time delay factors become large, it has been recognized as advantageous to introduce some form of scaling technique into the signal processing scheme, whereby smaller size, more efficient, and less expensive beam forming signal processor means can be utilized than would otherwise be the case.

DISCUSSION OF THE PRIOR ART

Scaling in a sonar signal processing beamformer has been proposed, in U.S. Pat. No. 3,239,799 to P. H. Boucheron, Jr., through the use of a system wherein an acoustic wavefront is received by a first array of receiving transducers in water, then reconstructed in modified or curved form in air for reception by a second array of receiving transducers. The electrical signals generated by the second array are then processed in the usual manner. The conversion of the original acoustic signals of a given frequency in water to acoustic signals in air or other gas at the same frequency, shortens the wavelength because of the slower speed of sound in air than in water, and so effects a useful scaling. This form of scaling may therefore be referred to as velocity scaling. In addition, in order to improve beamforming resolution, the Boucheron patent proposes the inclusion of acoustic lens means in the gas medium between the reprojecting array and the second receiving array.

Additional scaling has been effected in such a system, and as shown by U.S. Pat. No. 3,278,891 to R. R. Cowdery, by using a multi-channel recorder and playback device for recording the signals received through water at the first array, then playing back the recorded signals at a higher speed for projection by a transmitting array into air for reception by the second receiving array. The higher speed playback increases the signal frequencies and hence produces a desirable scaling down of wavelengths, thereby permitting use of a smaller and less expensive equipment in following processing stages wherein further scaling and beamforming can take place. This form of scaling is therefore known as frequency scaling.

While the multi-channel recorder reproducer of the Cowdry patent does effect scaling, multi-channel recording at one speed and playback at a multiple of that speed is technically quite difficult, and involves costly and cumbersome equipment, especially when a large number of transducer channels are involved. It also reduces reliability, and introduces a displacement of the system from real time operation.

In accordance with the teachings of the prior art, notably the Boucheron patent, focusing of the system to accommodate different ranges of targets by moving the receiving transducers (microphones) in the secondary receiving array can be accomplished much as an optical system image plane is moved to achieve clearer focus. This expedient would, of course, involve a considerably complex mechanical or electromechanical system to carry out.

SUMMARY OF THE INVENTION

The invention aims to overcome some or most of the just mentioned disadvantages of the prior art through the provision, in a sonar beamforming system, of improved signal processing, scaling, and focusing. In this regard, the invention contemplates the utilization of frequency scaling in combination with velocity scaling, wherein the frequency scaling is accomplished by frequency adding or heterodyning. Moreover, the invention aims to provide the additional advantage of focusing by oscillator frequency adjustment rather than through mechanical means, and an advantageous ability to tune the system to different sonar frequencies for a filtering effect and also to accommodate changes in velocity of sound in water due to temperature changes or the like.

With the foregoing in mind, it is a principal object of the invention to provide an improved beamforming sonar system.

Another object of the invention is the provision of improved frequency scaling in a beamforming sonar system of the type wherein both frequency scaling and velocity scaling are employed.

Still another object of this invention is to provide an improved sonar system of the foregoing character wherein frequency scaling is accomplished through heterodyning.

Yet another object is to provide a sonar system that can utilize a large array of many transducers for reception of low frequency acoustic energy (say, less than 15 KHz) and processing thereof for the purposes of beamforming, improved target resolution, and the like, without the expense and technical problems heretofore involved in using multi-channel recorders for frequency scaling, or the expensive electronic delay means for effecting the necessary time and frequency phasing of signals, a practice that increases in size, complexity, and, of course, cost, as frequencies of operation go lower.

A further object is the use of a variable frequency source for use in heterodyning or adding to received frequencies for the purpose of realizing changes in the effective index of refraction in the velocity scaling and beamforming section of the system, whereby focusing and/or frequency tuning or filtering may be achieved.

Other objects and many of the attendant advantages will be readily appreciated as the subject invention becomes better understood by reference to the following detailed description, when considered in conjunction with the accompanying drawings.

DESCRIPTION OF THE DRAWINGS

FIG. 1 is a diagrammatic illustration, partly in block form, showing a low frequency sonar system embodying the invention; and FIG. 2 is a ray diagram illustrating various relationships in the system of FIG. 1.

DESCRIPTION OF THE PREFERRED EMBODIMENT

In the form of the invention illustrated in the drawings and described hereinafter, there is provided a sonar system 10 comprising a primary receiving transducer array 12, shown mounted on the exterior of a section 14 of ship hull so as to be able to receive acoustic energy or wavefronts traveling through the surrounding water medium 16. Array 12 will thus be considered to be a fixed conformal array having a radius of curvature Rp, but it will be understood that any array, either fixed or movable, conformal or otherwise may be used with the invention in any circumstance where space and cost factors for signal processing equipment in effecting beamforming is important.

The individual transducer elements 18 of array 12 are connected by suitable conductor means, represented by flow lines 20, to provide corresponding inputs to a frequency mixer 22 in which incoming signals from transducer elements 18 are heterodyned with a frequency $F_{osc}$ that is derived from a variable frequency oscillator 24 and supplied via line 26 to mixer 22. Oscillator 24 is variable in a manner and for purposes which will be made apparent later in this specification. Mixer 22 serves to add oscillator frequency $F_{osc}$ to each of the incoming signals from array 12 so as to provide higher frequency signals having all of the information content of the lower frequency signals from array 12.

The resulting higher frequency outputs of mixer 22, which are represented by lines 28, one for each transducer element 18, are amplified by amplifier means 30, and applied via lines 32 to a re-transmitting or secondary array 34. Secondary array 34 comprises transducer elements 38 corresponding in number to transducers 18, arranged with a radius of curvature $R_s$ and disposed in an acoustic energy conducting gas medium 40 wherein the velocity of sound is considerably less than in the water medium. In the present example, array 34 is disposed in a mixture of air and Freon 114 (Dichlorotetrafluoroethane) as the acoustic energy conducting gas medium 40, confined in a suitable enclosure 42, represented by broken lines. A mixture ratio of 2:1 of air to Freon is suitable.

A gas filled acoustic lens 46 is also disposed within medium 40 and serves to focus acoustic energy, transmitted by secondary array 34, on a final receiving or tertiary array 52, conveniently disposed in, or at least in acoustic communication with, the gas medium 48 of lens 46. In this exemplary embodiment, lens 46 is cylindrical and has a radius of curvature $R_L$. Because of the higher frequencies produced by array 34, and because of the lower speed of travel of acoustic energy in gas mediums 40 and 48, the wavelengths of the energy traveling therein will be considerably less than the wavelengths of the acoustic energy in the water medium. This being the case, the elements concerned, that is enclosure 42, array 34, lens 46, and array 52 need be correspondingly smaller than array 12.

Array 52 comprises a curved assembly or matrix of microphonic transducers 54, connected as shown respectively by lines 56 to a sonar signal processor 60. Processor 60 uses conventional detection, amplification, and sweep generating circuitry to generate those signals, all represented by line 62, necessary for presenting a visual display on a suitable sonar display means 64.

In accordance with the preferred embodiment of the invention, system 10 comprises means for controlling variable frequency oscillator 24 in accordance with one or more variables including frequency or frequencies intended to be received, target range, and local water conditions affecting sound velocity, such as water temperature, water salinity, etc. System 10 comprises sources of analog inputs, e.g., voltages, representative of those variables. Thus, a range cursor generator 70, usually under the control of the sonar operator, provides range analog signals via line 72 to display means 64, and via line 74 to a control signal generator 76. Examples of echo-ranging circuits which generate electrical signals representative of target range are found in U.S. Pat. No. 2,666,190 to D. H. Ransom, Jr., and in U.S. Pat. No. 2,789,284 to W. M. Silhavy.

A receiving frequency selector 80, also under the control of the operator, provides an analog signal representative of the selected frequency F or range of frequencies via line 82 to control signal generator 76. Similarly, analog signals from various sensors, represented collectively at 84 are applied to generator 76 as shown by line 86. Examples of such sensors for generating electrical signals representative of the mentioned water temperature and salinity conditions may be found in the volume entitled Oceanographic Instrumentation authored by Jerome Williams and published in 1973 by the United States Naval Institute, Annapolis, Md., Library of Congress Catalog Card No. 72-92657.

Control signal generator 76 provides an oscillator control signal, via line 90 to oscillator 24, that is a function of the various inputs thereto. In their simplest forms control signal generator 76 comprises an analog voltage summing circuit, and oscillator 24 comprises a voltage controlled oscillator.

The advantageous effects achieved by controlled heterodyning, or addition of a controlled oscillator frequency to each of the low frequency signals received by primary array elements 18 will now be discussed with reference to FIG. 2, wherein $C_1$, $C_2$, and $C_3$ represent respective velocities of sound in water, gas medium 40, and gas medium 48. Consider first that heterodyning according to this invention is absent. In that circumstance, the frequency F of a signal received at primary array 12 will be preserved through tertiary array 52 of the system, and the wavelengths $\lambda_1$, $\lambda_2$, and $\lambda_3$, for frequency F in the water and two gas mediums will depend in a well known manner upon velocities $C_1$, $C_2$ and $C_3$, therein.

Now, the function of any lens is to provide time delays so that all incident plane rays arrive at a single point (image point) at the same time (in phase). The acoustic ray paths of interest in this analysis are those shown in FIG. 2. On the left of this figure is the primary array of radius $R_p$, with a plane wave, $\Sigma$, incident normal to the acoustic axis. On the right of the figure is the secondary array of radius $R_s$ and lens of radius $R_L$. The projected ray emanating from point B is focused at a point E, a distance $f$ (the focal length) from the center of the gas lens.

The requirement for a plane wave to be focused at E is, $$\frac{\overline{AB}}{\lambda_1} + \frac{\overline{B'D}}{\lambda_2} + \frac{\overline{DE}}{\lambda_3} \cong \frac{\overline{V'C}}{\lambda_2} + \frac{\overline{CE}}{\lambda_3}. \quad (1)$$

This insures that a ray incident on the primary array (point B) at an arbitrary incidence angle will arrive at the focal point at the same time (or phase) as the ray arriving along the acoustic axis. Strict equality is not required because, by the Rayleigh Criterion, phase errors of $\lambda/4$ are permitted without serious degradation of focusing. In this case phase errors arise due to spherical aberrations. Rewriting the path segment factors in their trignometric equivalents yields $$\frac{R_p(1 - \cos\theta)}{\lambda_1} + \frac{(R_s - R_L)\cos\theta}{\lambda_2}$$
$$+ \frac{\sqrt{R_L^2 + f^2 + 2R_L f \cos\theta}}{\lambda_3} - \frac{(R_L + f)}{\lambda_3} - \frac{(R_s - R_L)}{\lambda_2} \approx 0 \quad (2)$$

Based on The Gauss lens equation, the focal length $f$ of a single element lens of this type can be written $f = R_L/(\eta_e - 1)$ where $\eta_e$ is the refractive index of the lens. The refractive index of the lens is the ratio of wavelengths $\lambda_2$ and $\lambda_3$; i.e., $\eta_e = \lambda_2/\lambda_3$.

With algebraic manipulation, Equation (2) becomes $$\frac{\lambda_3}{\lambda_1} R_p(1 - \cos\theta) + \frac{(R_L - R_s)(1 - \cos\theta)}{\eta_e}$$
$$- \frac{\eta_e}{(\eta_e - 1)} R_L + \frac{R_L}{(\eta_e - 1)} \sqrt{\eta_e^2 + (2 - 2\eta_e)(1 - \cos\theta)} \approx 0 \quad (3)$$

A bionomial expansion of the square root term reveals that $$\frac{\lambda_3}{\lambda_1} R_p(1 - \cos\theta) + \frac{(R_L - R_s)(1 - \cos\theta)}{\eta_e} - \frac{\eta_e}{(\eta_e - 1)} R_L$$
$$+ \frac{R_L \cdot \eta_e}{(\eta_e - 1)} - \frac{R_L}{\eta_e}(1 - \cos\theta) \cong 0 \quad (4)$$

which can only be true if $$\frac{\lambda_3}{\lambda_1} R_p(1 - \cos\theta) = \frac{R_s}{\eta_e}(1 - \cos\theta) \quad (5)$$

or $$\frac{R_p}{R_s} = \frac{1}{\eta_e} \cdot \frac{\lambda_1}{\lambda_3}. \quad (6)$$

The quantities $\lambda_1$, and $\lambda_2$ can be written as $$\lambda_1 = \frac{C_1}{F_1}; \quad \lambda_2 = \frac{C_2}{F_2}.$$

Recalling that $$\eta_e = \frac{\lambda_2}{\lambda_3},$$

Equation (6) becomes $$\frac{R_p}{R_s} = \frac{C_1}{F_1} \cdot \frac{F_2}{C_2} \cdot \frac{1}{\eta_e}$$

or $$\frac{R_p}{R_s} = \frac{C_1}{C_2} \cdot \frac{F_2}{F_1} \cdot \frac{1}{\eta_e}. \quad (7)$$

The above relationship shows that the ratio of physical sizes of the primary array 12 to the secondary array 34 is dependent upon the ratio of velocities of sound in water and in gas medium 40 and/or the ratio of the frequency $F_2$ in the latter medium to the frequency $F_1$ in the former.

If $F_2$ is increased according to the invention by adding a frequency factor $F_{osc}$ from oscillator 24, then $F_2 = F_1 + F_{osc}$ and equation (7) becomes $$\frac{R_p}{R_s} = \frac{C_1}{C_2} \cdot \frac{F_1 + F_{osc}}{F_1} \cdot \frac{1}{\eta_e} \quad (8)$$

Pursuing this relationship further, consider that the position of focal point E within lens 46 is governed by the thin lens equation $$f = \frac{R}{(\eta - 1)}.$$

If equation (8) is rewritten to express the value of the effective refractive index of the system, we find $$\eta_e = \frac{C_1}{C_2} \cdot \frac{F_1 + F_{osc}}{F_1} \cdot \frac{R_s}{R_p}. \quad (9)$$

Therefore, it is seen that the effective refractive index, and hence the position of focal point E, is a function of $F_{osc}$. Accordingly, the focal length of system 10 can be readily adjusted for purposes of accommodating range changes, different frequency reception, or the like by changing of the output frequency $F_{osc}$ of oscillator 24 in the manner described earlier. Moreover, as can be seen from equation (9) variations in velocity $C_1$ of sound in water due to local conditions can be compensated for by adjustment of oscillator 24.

From the foregoing it will be recognized that the invention not only achieves more economical, reliable, and compact frequency scaling in a beamforming system through the use of frequency heterodyning rather than recording and playback, but also the invention achieves a greater degree of flexibility of use in its ability to adapt to various conditions common to low frequency sonar systems.

It will also be recognized that various modifications or embodiments other than that described may be used in practice of the invention. For example, lens 46 may be omitted, and the focusing ability of a curved array 34 relied upon for focusing an image on array 52 in the velocity scaling section. Also other configurations of arrays 12 and 34 than the arcuate ones shown may be used.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A sonar system for processing low frequency acoustic energy signals received through a water medium characterized by a plurality of variable conditions, said system comprising, in combination:

a first array comprising a plurality of receiving transducers arranged in a first predetermined configuration for receiving said low frequency acoustic energy signals and converting them into corresponding low frequency electrical signals;

a controllable frequency local oscillator for providing electrical signals of selected frequency;

mixer means for adding said low frequency electrical signals and said local oscillator selected frequency electrical signals to provide higher frequency electrical signals representative of said low frequency acoustic energy signals;

housing means defining a cavity;

a body of acoustic energy conducting gas contained in said cavity;

a second array comprising acoustic energy projecting transducers arranged in a second predetermined configuration which is in a scaled down relationship to said first predetermined configuration, said second array being disposed in contact with said acoustic energy conducting gas and responsive to said higher frequency acoustic energy signals in said gas;

acoustic lens means, disposed in said gas, for focusing said higher frequency acoustic signals;

a third transducer array comprising receiving transducers for receiving said higher frequency acoustic energy signals focused by said acoustic lens means and converting them to sonar beam related higher frequency electrical signals;

signal processing and display means, connected to said third array, for providing a visual representation of said low frequency acoustic energy signals; and control means, connected to said controllable frequency local oscillator, for selecting said selected frequency in accordance with at least one of said plurality of variable conditions whereby said focusing of said higher frequency acoustic signals is adjusted automatically in response to changes in said one of said plurality of conditions.

2. A sonar system as defined in claim 1, and wherein said control means comprises:

a plurality of generators for providing a plurality of electrical analog signals each corresponding to a respective one of said plurality of conditions;

electrical analog signal combining means, connected to said plurality of generators, for providing to said controllable frequency local oscillator an oscillator control signal that is a function of said plurality of analog signals.

3. A sonar system as defined in claim 2, and wherein:

said oscillator means comprises a voltage controlled oscillator;

said electrical analog signals are voltage signals; and said signal combining means comprises a summing circuit.

* * * * *